United States Patent
Blomgren et al.

(10) Patent No.: US 11,454,151 B2
(45) Date of Patent: Sep. 27, 2022

(54) METHOD FOR CLEANING A COMPONENT OF AN EXHAUST AFTERTREATMENT SYSTEM AND AN EXHAUST SYSTEM

(71) Applicant: Volvo Truck Corporation, Gothenburg (SE)

(72) Inventors: Fredrik Blomgren, Hisings Kärra (SE); Soran Shwan, Mölndal (SE); Kunpeng Xie, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/408,263

(22) Filed: Aug. 20, 2021

(65) Prior Publication Data

US 2022/0056828 A1  Feb. 24, 2022

(30) Foreign Application Priority Data

Aug. 21, 2020 (EP) .................................... 20192107

(51) Int. Cl.
  *F01N 3/029* (2006.01)
  *F01N 13/00* (2010.01)
  *F01N 3/035* (2006.01)

(52) U.S. Cl.
  CPC ............ *F01N 3/0293* (2013.01); *F01N 3/035* (2013.01); *F01N 13/009* (2014.06)

(58) Field of Classification Search
  CPC ...... F01N 3/035; F01N 3/0293; F01N 13/009; F01N 13/008; F01N 2260/04;
  (Continued)

(56) References Cited

U.S. PATENT DOCUMENTS

| | | | |
|---|---|---|---|
| 6,010,547 A * | 1/2000 | Jeong | F01N 3/023 55/282.3 |
| 8,157,897 B2 * | 4/2012 | Meister | B01D 46/0067 95/279 |

(Continued)

FOREIGN PATENT DOCUMENTS

| | | |
|---|---|---|
| DE | 4134949 A1 | 4/1993 |
| DE | 102010042035 A1 | 4/2012 |

(Continued)

OTHER PUBLICATIONS

Extended European Search Report dated Jan. 26, 2021 for European Patent Application No. 20192107.9, 7 pages.

*Primary Examiner* — Phutthiwat Wongwian
*Assistant Examiner* — Diem T Tran
(74) *Attorney, Agent, or Firm* — Sage Patent Group

(57) ABSTRACT

A method is disclosed for cleaning a component of an exhaust aftertreatment system located downstream of a combustion engine in an exhaust flow path delimited by an outer wall. The exhaust aftertreatment system includes a first device releasably mounted in the outer wall upstream of the component and a second device releasably mounted in the outer wall downstream of the component, each of the devices being a sensor or an injector. The method includes sealing the exhaust flow path upstream of the first device and downstream of the second device, removing at least the first and second devices, thereby providing at least two openings in the outer wall, so that a cleaning flow path is provided, and introducing cleaning fluid into at least one of the openings, so that the cleaning fluid flows across the component via the cleaning flow path.

13 Claims, 3 Drawing Sheets

(58) Field of Classification Search
CPC ......... F01N 2560/00; F01N 2610/1453; F01N 3/0233; F01N 3/0235; F01N 3/0238; F01N 9/00
See application file for complete search history.

(56) References Cited

U.S. PATENT DOCUMENTS

| | | |
|---|---|---|
| 8,591,666 B2 | 11/2013 | Spruegel et al. |
| 2003/0159436 A1 | 8/2003 | Foster et al. |
| 2006/0144223 A1 | 7/2006 | Sellers et al. |
| 2010/0319731 A1* | 12/2010 | Spruegel ................. F01N 3/023 134/20 |

FOREIGN PATENT DOCUMENTS

| | | |
|---|---|---|
| EP | 1336729 A1 | 8/2003 |
| EP | 2270319 A1 | 1/2011 |
| JP | 2008-151062 * | 7/2008 |
| WO | 2014018883 A1 | 1/2014 |

* cited by examiner

METHOD FOR CLEANING A COMPONENT OF AN EXHAUST AFTERTREATMENT SYSTEM AND AN EXHAUST SYSTEM

CROSS-REFERENCE TO RELATED APPLICATIONS

The present application claims benefit of priority to European Patent Application No. 20192107.9, filed Aug. 21, 2020, the disclosure of which is incorporated herein by reference.

TECHNICAL FIELD

The present disclosure relates to a method for cleaning at least one component of an exhaust aftertreatment system provided downstream of a combustion engine. The present disclosure further relates to an exhaust system of a combustion engine and to a vehicle comprising such a system.

Embodiments described herein can be applied in heavy-duty vehicles, such as trucks, buses and construction equipment. Although embodiments will be described with respect to a truck, the inventive concepts are not restricted to this particular vehicle, but may also be used in other vehicles such as passenger cars and working machines. The inventive concepts may also be applied in vessels and in stationary construction equipment in which combustion engines and exhaust aftertreatment systems are used.

BACKGROUND

Exhaust aftertreatment systems, EATSs, are commonly used in the automotive field to reduce emissions from combustion engines. In order to comply with existing and upcoming emission legislations, it is desirable to minimize cold start emissions. Furthermore, EATS robustness and durability are becoming increasingly important to ensure compliance with such emission legislations.

System robustness and durability of an EATS depend to a large extent on different methods to minimize EATS deactivation. Over the life time of a heavy-duty vehicle powered by a combustion engine, the EATS components are subjected to certain emission species that cause deactivation. The deactivation negatively affects NOx-conversion, filtering capacity and fuel consumption of the vehicle. A particular problem with deactivation is physical clogging of components, caused mainly by ash and soot from the combustion process.

DE4134949 discloses subsequent thermal regeneration and purging of a soot filter of an EATS using compressed air during service. For purging of the soot filter, two dedicated service openings are provided on either side of the soot filter, into which openings pressure nozzles for blowing compressed air across the soot filter in a direction contrary to the normal flow direction of the exhaust gases are introduced.

However, in addition to a soot filter, the EATS usually include a number of different components that are negatively affected by physical clogging, including for example a Diesel Oxidation Catalyst, a Selective Catalytic Reduction catalyst, and/or other catalytically active components in various configurations. The space available within the EATS is furthermore very restricted, making it difficult to gain access to the different components for cleaning purposes during service without having to remove the components.

SUMMARY

A primary object is to provide a method and an exhaust system which alleviate at least some of the drawbacks of prior art methods and systems. In particular, it is an object to provide a versatile method for efficiently cleaning one or more component(s) of an exhaust aftertreatment system, EATS, without removing the component(s). A further object is to provide a space efficient exhaust system, in which one or more component(s) of the EATS may be easily cleaned without removing the component(s).

According to a first aspect, at least the primary object is achieved by a method according to claim 1 for cleaning at least one component of an exhaust aftertreatment system.

The exhaust aftertreatment system is located downstream of a combustion engine in an exhaust flow path delimited by an outer wall, the exhaust aftertreatment system comprising:

at least two devices, wherein a first device of the at least two devices is releasably mounted in the outer wall upstream of the at least one component in the exhaust flow path and a second device of the at least two devices is releasably mounted in the outer wall downstream of the at least one component in the exhaust flow path, each of the at least two devices being a sensor or an injector.

The method comprises:

sealing the exhaust flow path upstream of the first device and downstream of the second device, removing at least the first and second devices, thereby providing at least two openings in the outer wall, so that a cleaning flow path of the exhaust aftertreatment system is provided, and introducing cleaning fluid into at least one of the at least two openings, so that the cleaning fluid flows across the at least one component via the cleaning flow path.

According to a second aspect, at least the primary object is achieved by an exhaust system of a combustion engine according to claim 13. The exhaust system comprises:

an outer wall delimiting an exhaust flow path of the exhaust system, an exhaust aftertreatment system located within the exhaust flow path, comprising at least one component for treatment of exhaust gases, at least two devices, wherein a first device of the at least two devices is releasably mounted in the outer wall upstream of the at least one component in the exhaust flow path and a second device of the at least two devices is releasably mounted in the outer wall downstream of the at least one component in the exhaust flow path, each of the at least two devices being a sensor or an injector, wherein the at least two devices are removable so as to form at least two openings in the outer wall, at least one of the at least two openings being configured for receiving a cleaning fluid, and at least another one of the two openings being configured for ejecting the cleaning fluid, so that a cleaning flow path of the exhaust aftertreatment system is provided, and means for sealing the exhaust flow path upstream of the first device and downstream of the second device.

The component or components to be cleaned may be one or more catalytically active component(s), e.g. at least one Diesel Oxidation Catalyst (DOC), and/or at least one Selective Catalytic Reduction (SCR) catalyst. It may in some cases be at least one Diesel Particulate Filter (DPF). The at least one component may be a combined DOC-DPF, or a combined SCR-DPF. The component or components may also be an Ammonia Slip Catalyst (ASC), a Lean NOx Trap (LNT), a NOx Storage Reduction (NSR) catalyst, a Gasoline Particulate Filter (GPF), and/or a Passive NOx Adsorber (PNA). The method is generally applicable to EATSs in which catalytically active component(s) and releasably mounted devices are located sequentially within the exhaust flow path. The component to be cleaned may also be e.g. a mix box of the exhaust system, in which urea crystals may accumulate.

Since the at least two devices in the form of a sensor or sensors, and/or an injector or injectors, are devices that are already present in the exhaust aftertreatment system, EATS, and used during normal operation thereof, the openings in the outer wall of the exhaust flow path are achieved without use of additional dedicated components such as lids, plugs, valves, or similar. Consequently, a method for cleaning a component of the EATS is achieved by means of which an additional space requirement for dedicated components within the EATS is minimal. Instead of such additional components, openings provided by removing standard devices in the form of removable sensors and/or injectors are utilised in the cleaning process. Such standard devices are already present in the EATS and are needed during operation of the EATS to control and monitor the catalytic conversion process. Since the devices are usually provided and needed at various positions within the EATS, a versatile method is achieved by means of which any component or components provided between two removable standard devices may be purged using cleaning fluid.

Thus, each of the at least two devices is a sensor or an injector, which is needed during normal operation of the EATS. The at least one sensor may comprise at least one temperature sensor, and/or at least one soot detection sensor such as a radio frequency sensor, and/or at least one ammonium sensor. The at least one injector may comprise at least one urea injector, and/or at least one diesel injector.

The openings provided by removing the at least two devices form at least one inlet and at least one outlet of the cleaning flow path. The cleaning fluid flows from the at least one inlet, across the at least one component via the cleaning flow path, and to the at least one outlet. Thus, the cleaning fluid introduced via the at least one inlet is emitted/ejected via the at least one outlet. The opening configured for receiving a cleaning fluid may comprise a coupling interface for connecting a hose or a tube or similar. Likewise, the opening configured for ejecting a fluid may also comprise such a coupling interface.

Two or more components may be cleaned using the proposed method, either in parallel by providing more than two openings for injection/ejection of cleaning fluid, or sequentially by flowing cleaning fluid from an inlet provided by removing the first device, across two or more components located sequentially in the exhaust flow path, to an outlet provided by removing the second device. The method is not limited to removing two or three releasably mounted devices. Instead, the number of releasably mounted devices that are removed for the cleaning may be varied depending on the configuration of the exhaust system and the EATS, and on the conditions at e.g. a service station at which the cleaning is performed.

The cleaning method described herein may be used as an alternative to, or in combination with, a thermal regeneration process to restore catalytic activity of the at least one component.

Optionally, the exhaust aftertreatment system is positioned downstream of a turbocharger in the exhaust flow path, and sealing the exhaust flow path comprises sealing the exhaust flow path at the turbocharger.

Optionally, sealing the exhaust flow path at the turbocharger comprises preventing rotation of a turbine of the turbocharger. When the turbine is locked for rotation, turbine blades of the turbine prevent cleaning fluid from passing through the turbine. The turbine thus functions as a valve. Alternatively, a dedicated valve may be provided downstream of the turbocharger, wherein sealing the exhaust flow path comprises closing the valve.

Correspondingly, the exhaust system may comprise a turbocharger located upstream of the first device in the exhaust flow path, wherein the means for sealing the exhaust flow path comprises means for preventing rotation of a turbine of the turbocharger. Such a means for preventing rotation of the turbine may for example be a device configured to act on an axle connecting the turbine and a compressor of the turbocharger and thereby stop rotation.

Optionally, the exhaust aftertreatment system is positioned upstream of a tailpipe in the exhaust flow path, and sealing the exhaust flow path comprises blocking the tailpipe. Sealing of the exhaust flow path downstream of the component to be cleaned may thereby be achieved in a time efficient manner. A plug may be used for blocking the tailpipe. This is furthermore a space efficient solution since no additional components are needed within the exhaust system, in which the available space is usually restricted.

Optionally, a valve is further provided downstream of the second device in the exhaust flow path, and sealing the exhaust flow path comprises closing the valve. Thus, the means for sealing the exhaust flow path may comprise a valve provided downstream of the second device in the exhaust flow path. This may be an alternative to blocking the tailpipe. The valve provides increased versatility, in that it may be provided upstream of a component/components that is/are not to be cleaned.

The cleaning fluid may comprise a cleaning gas, and/or the cleaning fluid may comprise compressed air, and/or the cleaning fluid may comprise a liquid. Thus, the cleaning fluid may comprise a single cleaning gas such as compressed air, a single liquid, or a combination of one or more gas(es) and/or one or more liquid(s).

Optionally, the cleaning fluid comprises a cleaning gas. The cleaning gas may be a compressed cleaning gas, such as compressed air, or a combination of compressed air and another compressed gas. It may be a mixture of gases, or it may be a single gas. Any suitable gas may be used that may perform a non-reactive mechanical cleaning of the exhaust system. It may also be a gas that causes a reactive flow, such as a gas containing hydrogen. The gas should preferably be a non-corrosive gas.

Optionally, the cleaning fluid comprises compressed air. The cleaning fluid may consist of compressed air, or it may consist of a mixture of compressed air and one or more other gas(es). The cleaning fluid may further comprise a mixture of compressed air and liquid. By using compressed air as the cleaning fluid, a physical, i.e. mechanical, cleaning of the EATS is achieved. Compressed air may readily be provided by a compressor at a service station. Compressed air may e.g. be provided at a flow rate of 100-200 litres/minute for a time period of 20-120 seconds, such as at a flow rate of 120-150 litres/minute for 30-60 seconds. Also other flow rates and time periods may be used. Blowing compressed air via the cleaning flow path of the EATS has been found to be an efficient way of physically removing clogging of SCR and DOC components, caused by ash and soot.

Optionally, the cleaning fluid comprises a liquid. The cleaning fluid may consist of a liquid, or it may consist of a mixture of gas and liquid. By using e.g. an acid liquid as a cleaning fluid, such as an acetic acid or another weak acid, a chemical cleaning of the component may be achieved. The liquid may be any liquid that does not damage e.g. a catalytic coating of the component to be cleaned.

Optionally, introducing cleaning fluid into at least one of the at least two openings comprises introducing cleaning fluid into only one of the at least two openings. One or two other openings of the at least two openings may be used for ejecting the cleaning fluid after flowing across one or more component(s).

Optionally, said at least one component comprises at least a first component and a second component, the first component being located upstream of the second component in the exhaust flow path, wherein the exhaust system or the exhaust aftertreatment system further comprises a third device in the form of a sensor or an injector, the third device being releasably mounted in the outer wall between the first component and the second component, wherein the method further comprises:

removing the third device, thereby providing at least three openings into the exhaust flow path.

In this way, two components may be cleaned simultaneously without having to be cleaned sequentially. The two components may thereby be cleaned in parallel.

Optionally, the method comprises:

introducing cleaning fluid into only the opening provided by removing the third device, such that the cleaning fluid flows in opposite directions across the first and second components.

Parallel cleaning of the first and second components is thereby achieved using a single inlet. The cleaning fluid will in this case be ejected through the openings provided by removing the first and second devices.

Optionally, the method comprises:

simultaneously introducing cleaning fluid into at least two of the at least three openings.

Parallel cleaning of the first and second components may thereby be achieved by using two inlets and by using a common opening as an outlet for ejecting the cleaning fluid. Alternatively, more than one outlet openings may be provided by removing additional ones of the at least two releasably mounted devices, depending on the configuration of the exhaust system.

Optionally, the exhaust aftertreatment system comprises a particulate filter, such as a diesel particulate filter, and both of the first and second devices are located upstream of the particulate filter in the exhaust flow path. In this way, the particulate filter, e.g. the DPF, is not affected by the cleaning since it is located outside of the cleaning flow path. A certain clogging of the particulate filter is beneficial, since it contributes to the filtering of particulate matter.

Optionally, the method further comprises, subsequently to flowing cleaning fluid across the at least one component:

remounting the removed devices in the outer wall, and re-opening the exhaust flow path.

The EATS may thus rapidly be prepared for operation again after cleaning.

Optionally, introducing cleaning fluid comprises connecting at least one tube or hose to at least one of the at least two openings, wherein the cleaning fluid is introduced via the at least one tube or hose. The tube or hose may be provided with a nozzle for introducing cleaning fluid via the opening, functioning as an inlet of the cleaning flow path. The tube or hose may be connected to a tank or container, in which the cleaning fluid is contained, such as to a compression chamber of a compressor. Another tube or hose may be connected to another one of the at least two openings, functioning as an outlet of the cleaning flow path.

According to a third aspect, a vehicle comprising a combustion engine, such as an internal combustion engine, and the exhaust system according to the second aspect is provided. The vehicle may be a heavy-duty vehicle such as a bus, a truck, or a working machine.

Further advantages and advantageous features are disclosed in the following description and in the dependent claims.

BRIEF DESCRIPTION OF THE DRAWINGS

With reference to the appended drawings, below follows a more detailed description of embodiments cited as examples.

In the drawings.

The drawings are schematic and not drawn to scale.

DETAILED DESCRIPTION OF EXAMPLE EMBODIMENTS

Figure 1:
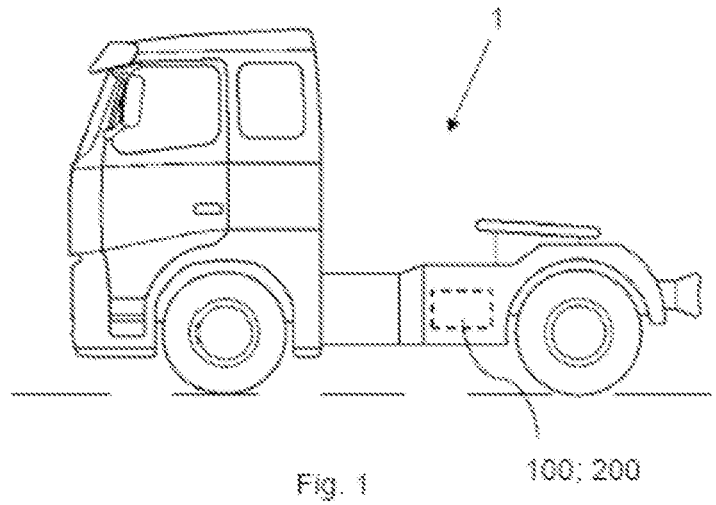
FIG. 1 is a schematic side view of a vehicle.

A vehicle 1 in the form of a truck is schematically shown in FIG. 1. The vehicle 1 includes an internal combustion engine (not shown) for propulsion of the vehicle 1, and an exhaust system 100; 200 for guiding and handling exhaust gases generated by the internal combustion engine.

Figure 3:
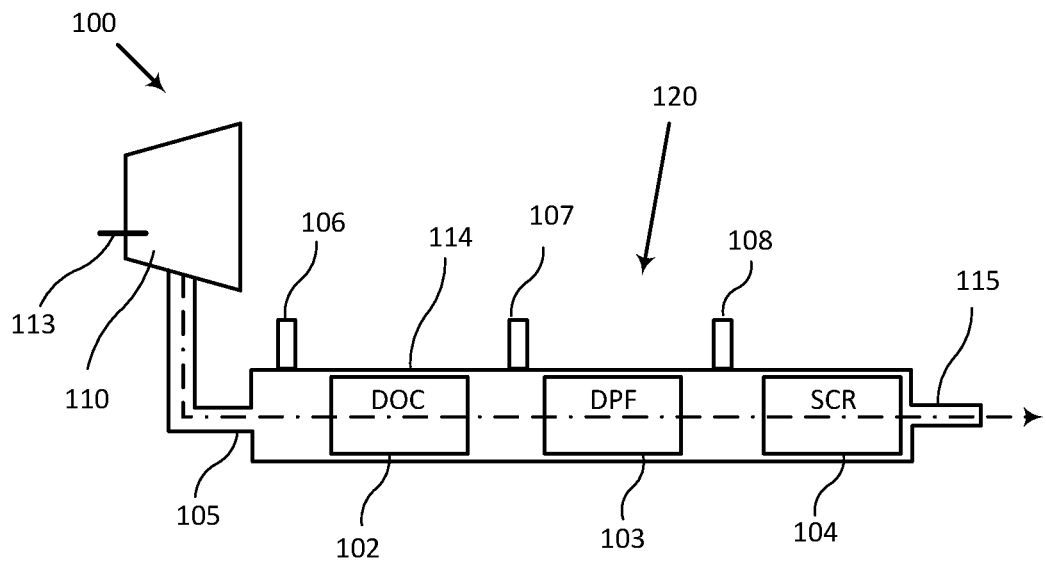
FIG. 3 is a schematic view of an exhaust system according to a first embodiment during normal operation.

An exhaust system 100 according to a first embodiment, which may be applied in the vehicle 1 is schematically illustrated in FIG. 3, showing the exhaust system 100 during operation of the vehicle. An outer wall 114 delimits an exhaust flow path 105 of the exhaust system 100, extending from the engine (not shown), via a turbine of a turbocharger 110, an exhaust aftertreatment system (EATS) 120, and through a tailpipe 115 provided downstream of the EATS 120, via which exhaust is emitted. The EATS 120, located within the exhaust flow path 105, in the shown embodiment comprises three components 102, 103, 104 for treatment of exhaust gases. In the shown embodiment, the components 102, 103, 104 are a Diesel Oxidation catalyst (DOC) substrate 102, a Diesel Particulate Filter (DPF) substrate 103, and a Selective Catalytic Reduction (SCR) substrate 104, respectively. Furthermore, devices 106, 107 in the form of first and second temperature sensors 106, 107 are provided on either side of the DOC substrate 102. Another device 108 in the form of a urea injector 108 is provided between the DPF substrate 103 and the SCR substrate, for injecting urea upstream of the SCR substrate 104. The first and second temperature sensors 106, 107 are releasably mounted in the outer wall 114 of the exhaust system 1. The urea injector 108 may also be releasably mounted in the outer wall 114.

During operation of the combustion engine, the exhaust follows the exhaust flow path 105 through the EATS 120, via the components 102, 103, 104 as illustrated in FIG. 3. The temperature sensors 106, 107 continuously monitor the temperature within the exhaust system 100, and the urea injector 108 injects urea needed for catalytic conversion at the SCR substrate 104.

Figure 4:
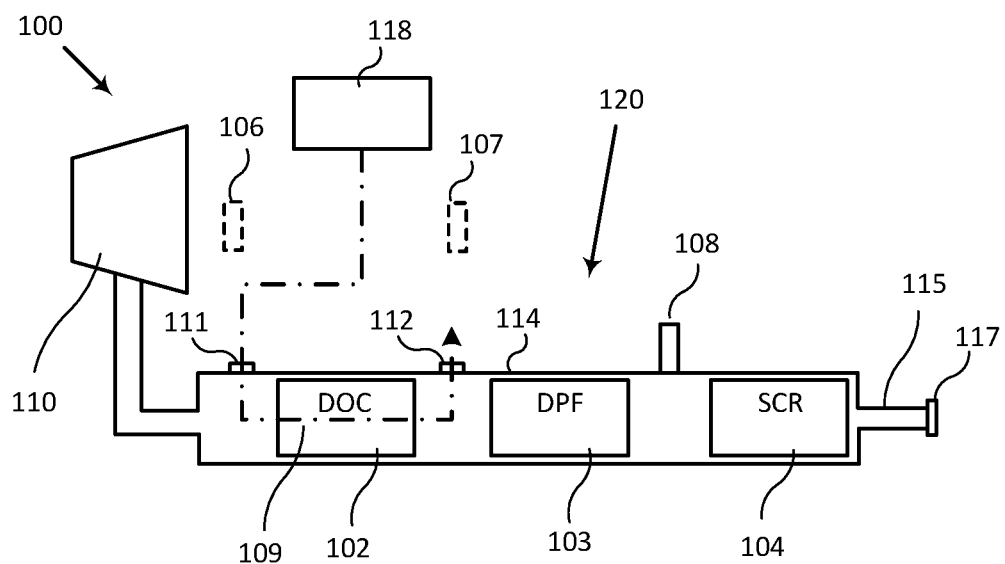
FIG. 4 shows the exhaust system of FIG. 3 during cleaning.

FIG. 4 shows the exhaust system 100 during cleaning of one component of the EATS 120, namely the DOC substrate 102, using a method according to an embodiment. In this embodiment, cleaning fluid in the form of compressed air is blown through a cleaning flow path 109, provided through a part of the EATS 120 by removing the first temperature sensor 106 and the second temperature sensor 107. The combustion engine (not shown) is turned off, and consequently no exhaust is generated.

Figure 2:
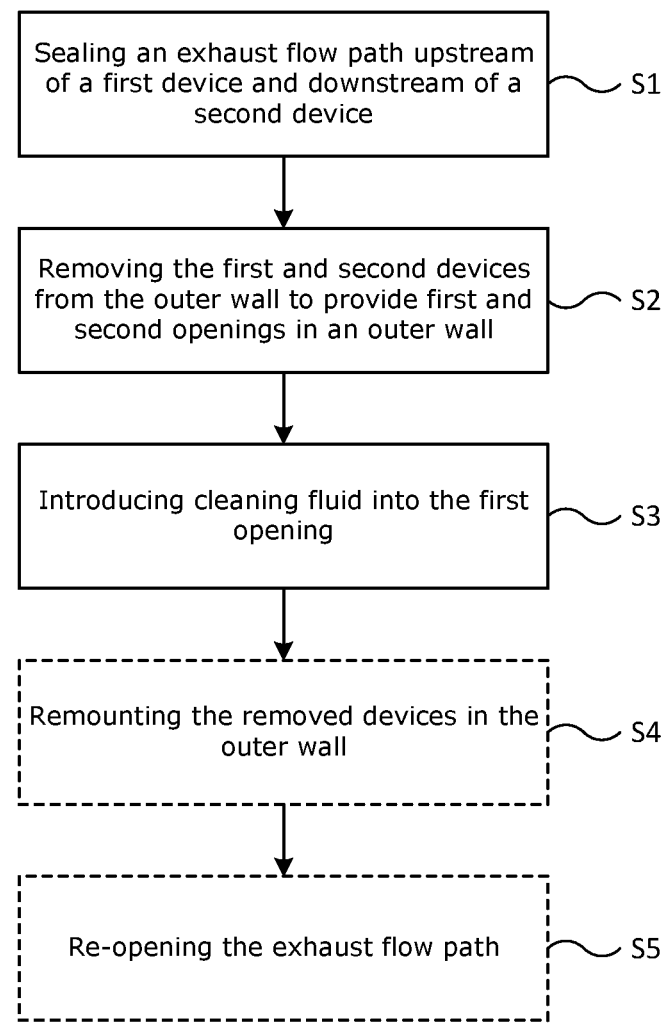
FIG. 2 is a flow chart illustrating a method according to a first aspect.

A method for cleaning the DOC substrate 102 of the exhaust system 200 shown in FIGS. 3 and 4 according to an embodiment is illustrated in the flow chart of FIG. 2. The method comprises the following steps:

S1) Sealing the exhaust flow path 105 upstream of a first device 106, which is herein the first temperature sensor 106, and downstream of a second device 107, which is herein the second temperature sensor 107. In the present embodiment, this is achieved by locking the turbine of the turbocharger 110 for rotation using a turbine locking device 113, and by blocking the tailpipe 115 using a plug 117, respectively.

S2) Removing the first and second devices 106, 107, i.e. the first and second temperature sensors 106, 107, from the outer wall 114. Thereby, first and second openings 111, 112 are provided in the outer wall 114, so that a cleaning flow path 109 of the EATS 120 is provided across the component or components to be cleaned, herein only the DOC substrate 102.

The steps S1 and S2 are preparatory for cleaning and may be performed in any suitable order. Step S1 or S2 may be performed fully or in part prior to carrying out the other one of the steps S1 and S2, fully or in part.

S3) Introducing cleaning fluid into the first opening 111, so that the cleaning fluid flows across the component or components to be cleaned, herein the DOC substrate 102, via the cleaning flow path 109 and out via the second opening 112. This step is carried out subsequently to the steps S1 and S2, when the exhaust flow path 105 has been blocked and when the temperature sensors 106, 107 have been removed. In the present embodiment, the cleaning fluid is in the form of compressed air provided from a compressor 118, connected to the first opening 111 by means of a hose or tube (not shown). The compressed air may alternatively be introduced into the second opening 112 and ejected via the first opening 111.

Although not illustrated in FIG. 4, also the urea injector 108 may be releasably mounted and removable so as to provide a third opening (not shown) in the outer wall 114. This may be useful if it is desired to e.g. clean the DPF substrate 103. If only the DPF substrate 103 is to be cleaned, two openings may be provided by removing the second temperature sensor 107 and the urea injector 108, thereby providing a cleaning flow path across the DPF substrate 103. This may be performed independently, or in connection with cleaning of the DOC substrate 102, i.e. before or after cleaning of the DOC substrate 102.

If both the DPF substrate 103 and the DOC substrate 102 are to be cleaned simultaneously, a cleaning flow path may be provided across both of the components 102, 103 by e.g. removing the first temperature sensor 106 and the urea injector 108. In this case, the first temperature sensor 106 constitutes the first device provided upstream of the components 102, 103 to be cleaned, and the urea injector 108 constitutes the second device provided downstream of the components 102, 103 to be cleaned. Cleaning fluid may preferably be introduced through the first opening 111 provided by removing the first temperature sensor 106, and emitted through the third opening provided by removing the urea injector 108.

Both of the temperature sensors 106, 107 and the urea injector 108 may also be simultaneously removed, thereby providing a cleaning flow path with three openings. Cleaning fluid may preferably be introduced through the first opening 111, and emitted through the second opening 112 and the third opening provided by removing the urea injector 108.

The method according to an embodiment may also comprise the following steps, marked with dashed lines in FIG. 2, to prepare the exhaust system 100 for normal operation after cleaning:

S4) Remounting the removed devices in the outer wall 114, thereby closing the cleaning flow path 109. In the embodiment illustrated in FIG. 4, the removed devices correspond to the temperature sensors 106, 107.

S5) Re-opening the exhaust flow path 105, in the present embodiment by unlocking the turbine such that it may rotate freely again, and by removing the plug 117 from the tailpipe 115.

All steps S1-S5 may be carried out with the components 102, 103, 104 mounted in the EATS 20, i.e. without removing any component prior to cleaning.

The method may be carried out for cleaning of components in a variety of differently configured EATSs, as long as the EATS comprises at least two releasably mounted devices in the form of at least one sensor and/or at least one injector, which may be removed to create a cleaning flow path across the component or components to be cleaned, and the EATS further comprises means for sealing the exhaust flow path upstream and downstream of the component(s), respectively.

Figure 5:
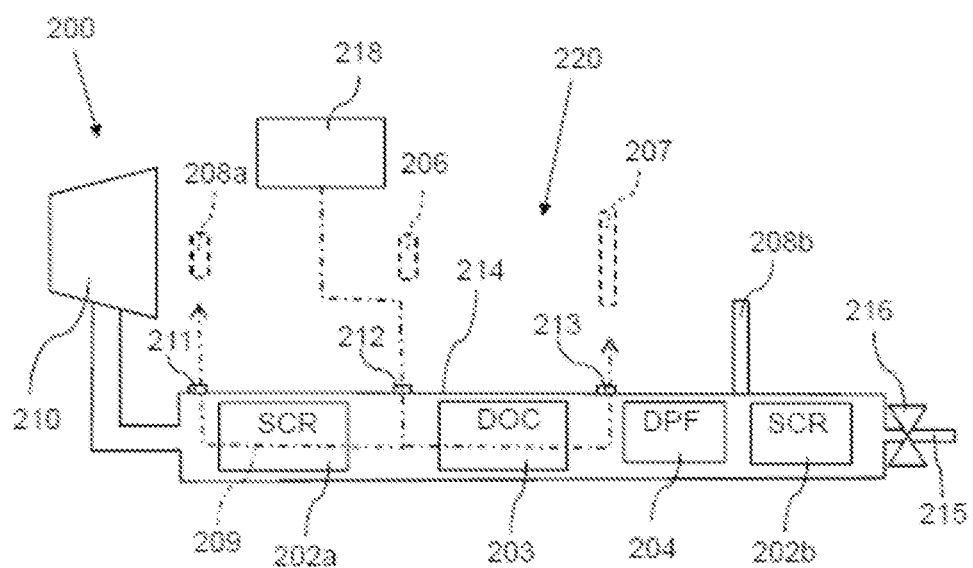
FIG. 5 is a schematic view of an exhaust system according to a second embodiment during cleaning.

An example of an exhaust system 200 according to a second embodiment in which the method may be applied is schematically shown in FIG. 5, showing the exhaust system 200 during cleaning. The exhaust system 200 herein comprises a turbine 210, an EATS 220 with first and second SCR substrates 202a, 202b, of which a first one 202a is mounted upstream and a second one 202b is mounted downstream of a DOC substrate 203 and a DPF substrate 204, and a tailpipe 215. A first temperature sensor 206 is releasably mounted in an outer wall 214 of the EATS 220, between the first SCR substrate 202a and the DOC substrate 203, and a second temperature sensor 207 is releasably mounted between the DOC substrate 203 and the DFP substrate 204. A first urea injector 208a is provided upstream of the first SCR substrate 202a and a second urea injector 208b is provided directly upstream of the second SCR substrate 202b. A valve 216 for sealing and opening the exhaust flow path (not shown) is provided in or directly upstream of the tailpipe 215. Alternatively, the valve 216 could be provided between the DPF substrate 204 and the SCR substrate 202b.

In the embodiment shown in FIG. 5, the first urea injector 208a and the temperature sensors 206, 207 are removable so as to create a cleaning flow path 209 across the first SCR substrate 202a and the DOC substrate 203. Thus, the first SCR substrate 202a constitutes a first component 202a to be cleaned and the DOC substrate 203 constitutes a second component 203 to be cleaned. The first urea injector 208a provided upstream of the first component 202a in the exhaust flow path thus constitutes a first device 208a, the second temperature sensor 207 provided downstream of the second component 203 constitutes a second device 207, and the first temperature sensor 206 provided between the components 202a, 203 constitutes a third device 206. Hence, three openings 212, 213, 211 are provided by removing the devices 206, 207 and 208a, respectively. A compressor or cleaning fluid tank 218 is connected to the opening 212 provided by removing the third device 207, and the remaining two openings 211, 213 are used for ejecting the cleaning fluid, such that the cleaning fluid flows in opposite directions across the first and second components 202a, 203. In alternative embodiments, cleaning fluid may be introduced via the opening 211 or 213 and ejected through one or both of the other openings.

Of course, also the second urea injector 208b may be releasably mounted, although it is envisaged that the need for cleaning the DPF substrate 204 is smaller than the need for cleaning the components upstream of the DPF substrate 204 in the exhaust flow path.

In other configurations of the type of EATS 220 shown in the second embodiment, comprising two SCR substrates connected in series within the exhaust flow path, the EATS may comprise a single Pt/Pd DPF component instead of separate DPF and DOC substrates, or it may comprise an integrated DOC-DPF component located between the two SCR substrates.

It is to be understood that the present inventive concepts are not limited to the embodiments described above and illustrated in the drawings; rather, the skilled person will recognize that many changes and modifications may be made within the scope of the appended claims. For example, any suitable devices such as a sensors and/or injectors mounted in the outer wall of an EATS may be used for injection and/or emission of cleaning fluid. Moreover, the EATS may have many different configurations, with components that may be cleaned using cleaning fluid mounted in different orders and numbers. Features from the first and second embodiments may be combined, e.g. may the valve 216 be exchanged for the plug 117 and vice versa. Furthermore, the EATS may in some embodiments comprise a combined SCR and DPF component located between a DOC substrate and an SCR substrate in the exhaust flow path.

The invention claimed is:

1. A method for cleaning at least one component of an exhaust aftertreatment system, the exhaust aftertreatment system being located downstream of a combustion engine in an exhaust flow path delimited by an outer wall, the exhaust aftertreatment system comprising at least three devices, a first device of the at least three devices being releasably mounted in the outer wall upstream of the at least one component in the exhaust flow path a second device of the at least three devices being releasably mounted in the outer wall downstream of the at least one component in the exhaust flow path, the at least one component comprising at least a first component and a second component, the first component being located upstream of the second component in the exhaust flow path, a third device of the at least three devices being releasably mounted in the outer wall between the first component and the second component, each of the at least three devices being in the form of a sensor or an injector, the method comprising:
   sealing the exhaust flow path upstream of the first device and downstream of the second device;
   removing at least the first, second and third devices, thereby providing at least three openings in the outer wall into the exhaust flow path, so that a cleaning flow path of the exhaust aftertreatment system is provided; and
   introducing cleaning fluid into at least one of the at least three openings, so that the cleaning fluid flows across the at least one component via the cleaning flow path by:
      introducing the cleaning fluid into only the opening provided by removing the third device, such that the cleaning fluid flows in opposite directions across the first and second components, or
      simultaneously introducing the cleaning fluid into at least two of the at least three openings.

2. The method according to claim 1, wherein the exhaust aftertreatment system is positioned downstream of a turbocharger in the exhaust flow path, and wherein sealing the exhaust flow path comprises sealing the exhaust flow path at the turbocharger.

3. The method according to claim 2, wherein sealing the exhaust flow path at the turbocharger comprises preventing rotation of a turbine of the turbocharger.

4. The method according to claim 1, wherein the exhaust aftertreatment system is positioned upstream of a tailpipe in the exhaust flow path, and wherein sealing the exhaust flow path comprises blocking the tailpipe.

5. The method according to claim 1, wherein a valve is further provided downstream of the second device in the exhaust flow path, and wherein sealing the exhaust flow path comprises closing the valve.

6. The method according to claim 1, wherein the cleaning fluid comprises a cleaning gas, and/or wherein the cleaning fluid comprises compressed air, and/or wherein the cleaning fluid comprises a liquid.

7. The method according to claim 1, wherein introducing the cleaning fluid into at least one of the at least three openings comprises introducing the cleaning fluid into only one of the at least three openings.

8. The method according to claim 1, wherein the exhaust aftertreatment system comprises a particulate filter, such as a diesel particulate filter, and wherein both of the first and second devices are located upstream of the particulate filter in the exhaust flow path.

9. The method according to claim 1, further comprising, subsequently to flowing the cleaning fluid across the at least one component:
   remounting the removed devices in the outer wall, and
   re-opening the exhaust flow path.

10. The method according to claim 1, wherein introducing the cleaning fluid comprises connecting at least one tube or hose to at least one of the at least three openings, wherein the cleaning fluid is introduced via the at least one tube or hose.

11. An exhaust system of a combustion engine, the exhaust system comprising:
   an exhaust flow path;
   an outer wall;
   an exhaust aftertreatment system;
   at least three devices;
   the exhaust flow path being delimited by the outer wall;
   the exhaust aftertreatment system being located within the exhaust flow path;
   the exhaust aftertreatment system comprising at least one component for treatment of exhaust gases;
   the at least three devices comprising a first device, a second device and a third device;
   the first device being releasably mounted in the outer wall upstream of the at least one component in the exhaust flow path;
   the second device being releasably mounted in the outer wall downstream of the at least one component in the exhaust flow path;
   the at least one component comprising at least a first component and a second component;
   the first component being located upstream of the second component in the exhaust flow path;
   the third device being releasably mounted in the outer wall between the first component and the second component;
   each of the at least three devices being a sensor or an injector;

the at least three devices being removable so as to form at least three openings in the outer wall;

at least one of the at least three openings being configured for receiving a cleaning fluid;

at least another one of the three openings being configured for ejecting the cleaning fluid, so that a cleaning flow path of the exhaust aftertreatment system is provided; and a locking device and a valve for sealing the exhaust flow path upstream of the first device and downstream of the second device.

12. The exhaust system according to claim 11, further comprising a turbocharger located upstream of the first device in the exhaust flow path, wherein the locking device for sealing the exhaust flow path comprises a turbine locking device for preventing rotation of a turbine of the turbocharger, and/or wherein the valve for sealing the exhaust flow path is provided downstream of the second device in the exhaust flow path.

13. A vehicle comprising a combustion engine and an exhaust system according to claim 11.

* * * * *